United States Patent [19]

Ketels

[11] Patent Number: 5,372,538

[45] Date of Patent: Dec. 13, 1994

[54] METHOD AND APPARATUS FOR PREPARING A PIG'S HEAD FOR MECHANICAL BONING

[75] Inventor: Gerardus H. J. Ketels, Grave, Netherlands

[73] Assignee: Stork Protecon B.V., AE Oss, Netherlands

[21] Appl. No.: 50,601

[22] Filed: Apr. 22, 1993

[30] Foreign Application Priority Data

Apr. 23, 1992 [NL] Netherlands .......................... 9020049
Aug. 7, 1992 [NL] Netherlands .......................... 9201426

[51] Int. Cl.$^5$ .................. A22C 17/04; A22C 17/12
[52] U.S. Cl. ................................. 452/135; 452/160; 452/170; 30/388
[58] Field of Search ............... 452/135, 152, 160, 170; 30/166.3, 392, 394; 83/746, 758, 781, 613, 697

[56] References Cited

U.S. PATENT DOCUMENTS

| | | | |
|---|---|---|---|
| 50,119 | 9/1865 | Harner | 30/388 |
| 1,764,551 | 6/1930 | Dolzer | 452/135 |
| 2,169,951 | 8/1939 | Hannan | 452/160 |
| 2,811,742 | 11/1957 | Jackson | 452/160 |
| 2,829,398 | 4/1958 | Carpenter et al. | 452/160 |
| 3,890,673 | 6/1975 | Neubauer | 452/160 |
| 4,052,769 | 10/1977 | Thillet et al. | 452/160 |
| 4,653,145 | 3/1987 | Swilley | 452/160 |
| 4,662,028 | 5/1987 | Leining | 452/160 |
| 4,918,788 | 4/1990 | Passchier | 452/135 |

FOREIGN PATENT DOCUMENTS

| | | |
|---|---|---|
| 0197615 | 10/1986 | European Pat. Off. . |
| 8701609 | 2/1989 | Netherlands . |
| 694746 | 7/1953 | United Kingdom ............ 452/160 |
| 2014430 | 8/1979 | United Kingdom . |
| 8807329 | 10/1988 | WIPO . |
| 8807820 | 10/1988 | WIPO . |
| 9119422 | 12/1991 | WIPO . |

*Primary Examiner*—Willis Little
*Attorney, Agent, or Firm*—Wegner, Cantor, Mueller & Player

[57] ABSTRACT

A method for preparing a pig's head for mechanical boning including making a transverse cut in the snout from the underside of the head so that the transverse cut separates the greater part of the rostral bone from the greater part of the jaw-bone, and apparatus for carrying out the method which includes a support structure for upside down placing thereon of the pig's head for preparing and cutting a member movable toward the support structure in direction inclining relative to the support structure and adapted for making a transverse cut in the snout from the underside of the head.

12 Claims, 2 Drawing Sheets

METHOD AND APPARATUS FOR PREPARING A PIG'S HEAD FOR MECHANICAL BONING

The present invention relates to a method for preparing a pig's head for mechanical boning and also to an apparatus for preparing a pig's head for mechanical boning.

In mechanical boning of a pig's head use is usually made of a boning line wherein the pig's head is placed on a carrier and wherein butchering operations are performed on the pig's head in diverse stations of the boning line. It is important herefor that the pig's head is placed on a carrier and that this carrier is guided together with the pig's head along the various stations. Since at the stations of the boning line great forces are typically applied to the pig's head in respect of removing pieces of meat and the like from the bone of the pig's head, it is important that the pig's head is fixed firmly on the carrier.

The object of the present invention is to provide a method and a device for preparing a pig's head for mechanical boning which enables fixing of the thus prepared pig's head on a carrier with which the pig's head is carried along a boning line.

This object is achieved by making a transverse cut in the snout from the underside of the head, wherein the cut separates the greater part of the rostral bone (os rostrale) from the greater part of the jaw bone (os incisivum).

As a result of these steps it is possible to separate the rostral bone from the nose bone so that the mask can be at least partially removed.

After performing this operation several cavities have been opened so that it is possible to place the pig's head on a carrier such that the pig's head is sufficiently fixed for operations to be carried out during the boning process. Moreover, when the mask is pulled away sufficiently far, a considerable portion of the bone of the head is exposed, which likewise offers possibilities for fixation.

Another advantage of the above device lies in the fact that the rostral bone separated from the remaining skeleton forms a good gripping point for pulling loose the mask.

This step facilitates the pulling loose of the mask from the head.

Making a cut in the snout in lengthwise direction which extends into the rostral bone improves the accessibility of the nasal cavity.

According to the invention the device comprises a saw-blade which is driven in rotation and movable into the snout in a path extending in lengthwise direction of the head from the front of the snout, and which protrudes at least partially above the support plate.

According to a preferred embodiment a cut extending in lengthwise direction is made through the rind in the middle of the upper part of the head.

According to another preferred embodiment the device comprises a knife-blade which is driven in rotation and movable through a gap arranged in the support plate and which is adapted for cutting along the upper part of the head through the rind substantially to the bone.

It becomes easier herewith to pull the mask off the pig's head at one of the first stations of the subsequent butchering line.

BRIEF DESCRIPTION OF THE DRAWINGS

The present invention will subsequently be elucidated with reference to the annexed drawings, in which.

Figure 1:
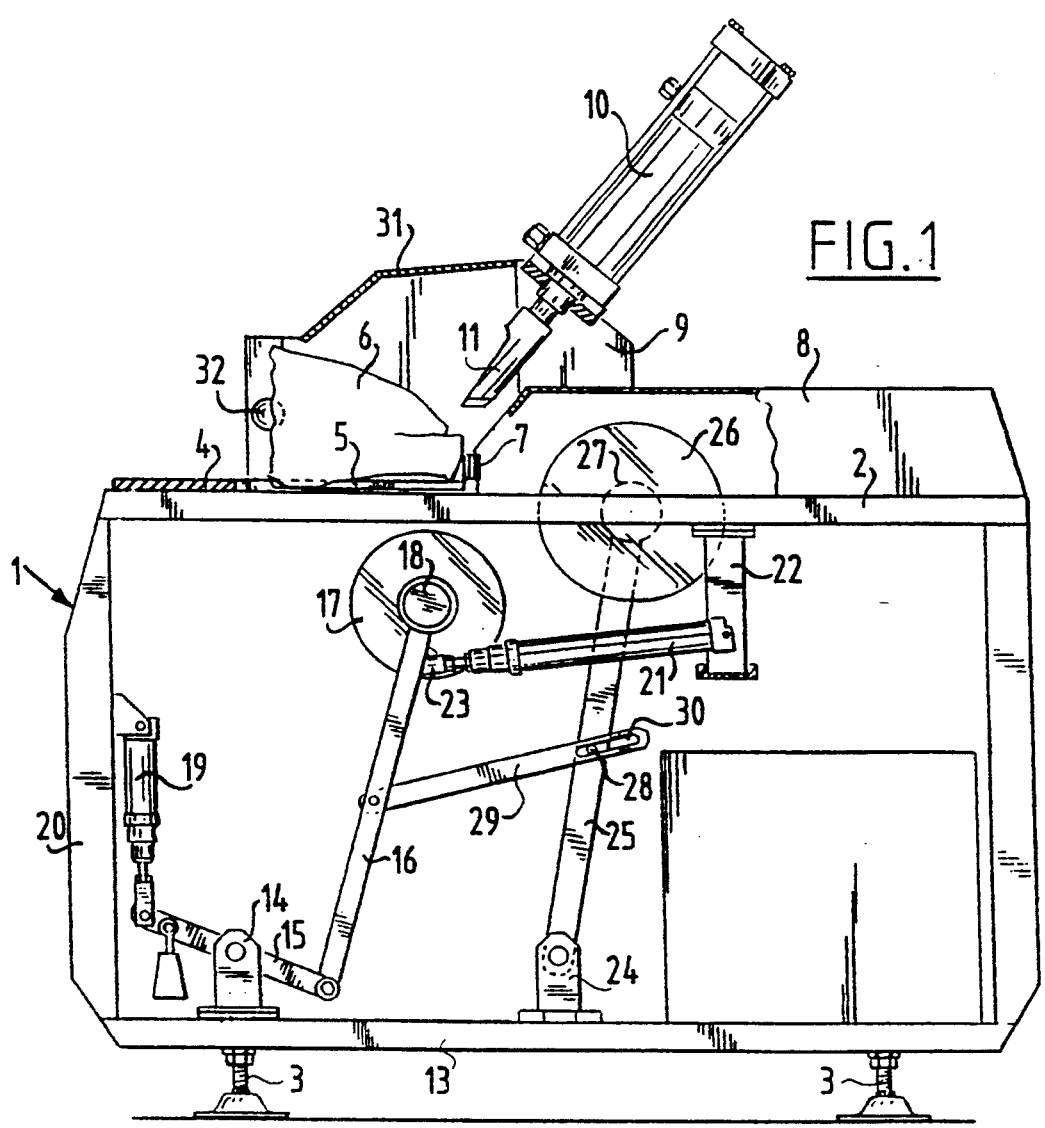
FIG. 1 shows a cross sectional view of a device according to the present invention.

The device shown in FIG. 1 is formed by a casing 1 which is closed on its top by a plate 2 and which rests on the ground on its bottom by means of adjustable legs 3. In preference the casing is manufactured from stainless steel to enable easy cleaning.

Arranged on top plate 2 is a support plate 4 extending partially thereabove which is provided with a recess 5 for positioning of the pig's head 6 for preparing. Forward of the position where the pig's head comes to rest is arranged a set of switches 7 which detect whether a pig's head is present. Above the other part of upper plate 2 is a cover 8.

Fixed to the cover 8 is a support 9 to which a pneumatic cylinder 10 is attached. A cutting member in the form of a cleaving knife 11 is fixed to the piston rod of the pneumatic cylinder.

Figure 2:
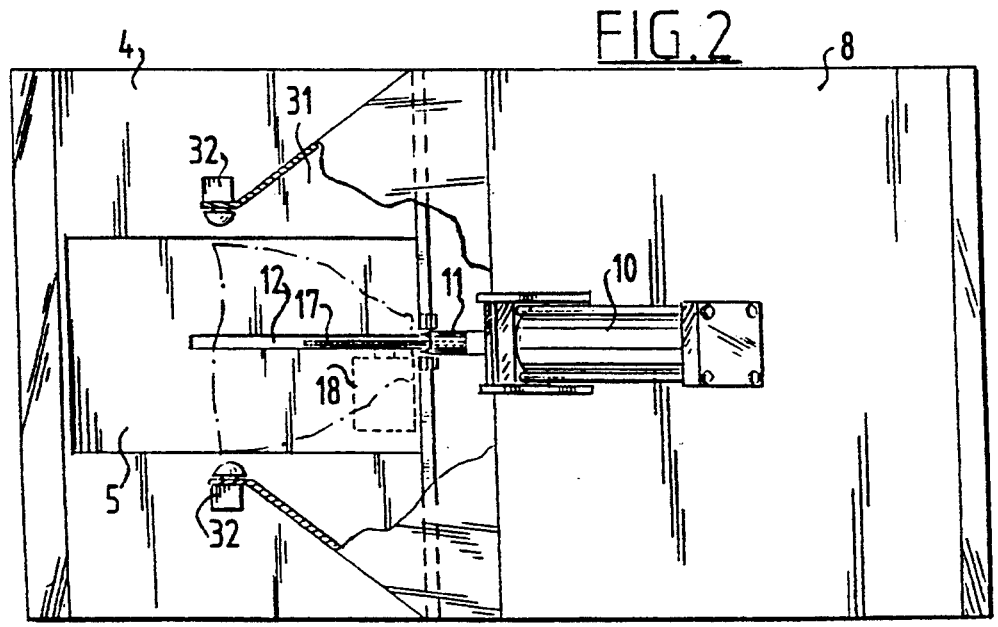
FIG. 2 is a top view of the device depicted in FIG. 1.

In the middle of support plate 4 a continuous slot 12 is arranged, as shown in FIG. 2. The slot 12 otherwise also extends through the greater part of upper plate 2 and through the front wall of cover 8.

Arranged in the interior of the casing 1 against the bottom 13 of casing 1 is a support 14 to which a second lever 15 is fixed rotatably. Fastened rotatably to one end of the second lever 15 is a first lever 16, to the other end of which is fixed a round knife 17 drivable in rotation. The knife-blade 17 is drivable by means of a hydromotor 18 fixed on the first lever 16. In addition the other side of the second lever 15 is connected to the piston rod of a pneumatic cylinder 19 which is attached with its fixed end to the front wall 20 of casing 1. When the pneumatic cylinder 19 is energized the rotatably drivable knife-blade 17 will thus be moved upward, wherein the knife-blade extends through the slot 12.

For movement in substantially horizontal direction is arranged a pneumatic cylinder 21 which is rotatably connected with its fixed end to a support 22 fixed to the upper plate 2. The piston rod 23 of this pneumatic cylinder 21 is connected to the first lever 16. When the pneumatic cylinder 21 is energized the rotatable knife-blade 17 is moved in substantially horizontal direction.

Finally, against the bottom 13 is arranged another support 24 to which a third lever 25 is rotatably fastened. Fixed to the free end of the third lever 25 is a rotatably drivable saw-blade 26. The rotatably drivable saw-blade 26 is drivable by a hydromotor 27.

The third lever 25 is provided with a pin 28 which extends through a slot 30 arranged in a fourth lever 29. The third lever 25 will thus follow the movements of lever 16, albeit with a free stroke which is caused by the length of slot 30. As a result the rotatably drivable saw-blade 26 will follow with the same free stroke in horizontal direction the movements in horizontal direction of the rotatably drivable knife-blade 17.

Arranged above support plate 4 and in particular above the recess 5 is a protective cage 31 which ensures that, when a head for processing is present, the user cannot move with his hands into the vicinity of the cleaving knife 11, knife-blade 17 or saw-blade 27. As extra safety precaution safety switches 32 are arranged on the sides of cage 31, wherein the driving and the movement of said sawing, cleaving and cutting implements is only possible when these switches 32 are pressed in. The distance between both switches 32 is such that they cannot be pressed in with one hand, so that the user needs both hands to press in the switches and cannot therefore move his hands into the vicinity of the dangerous components.

Figure 3:
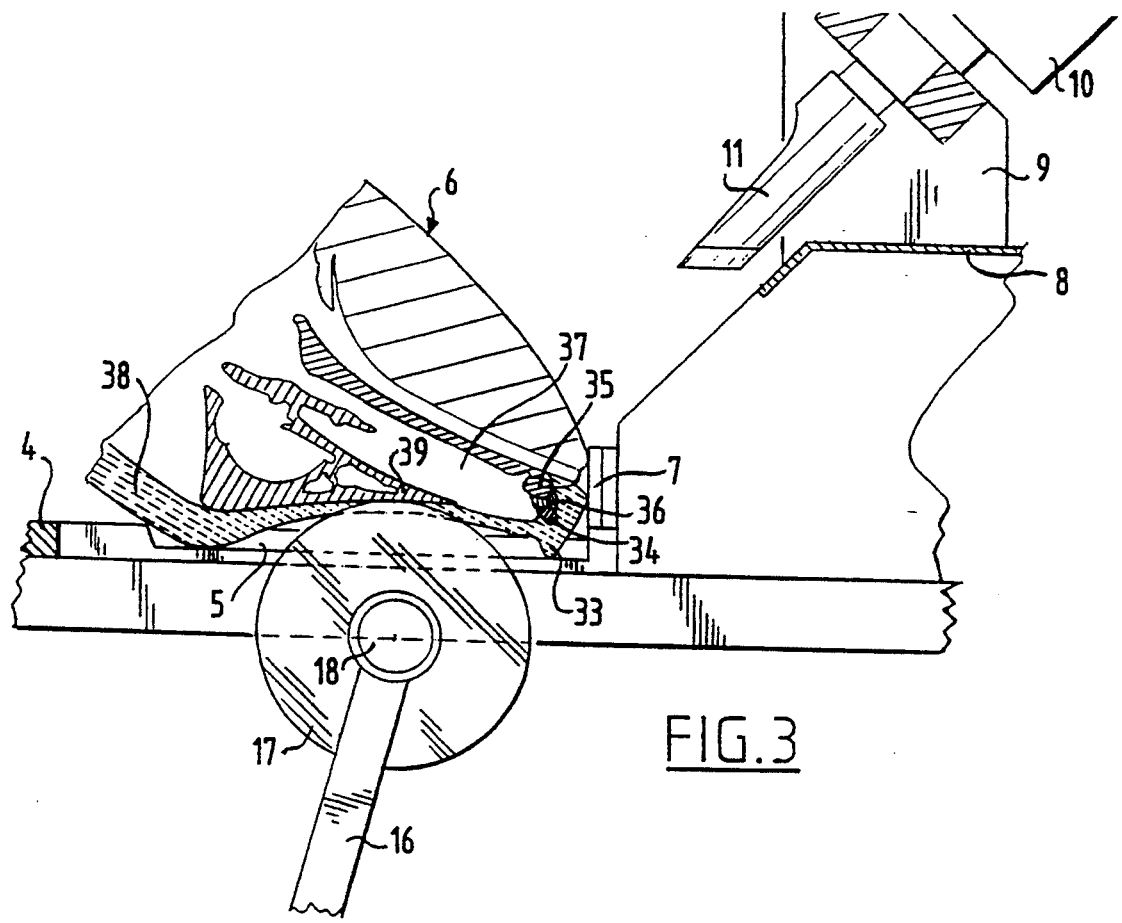
FIG. 3 is a detailed cross sectional view of the device depicted in FIG. 1.
Figure 4:
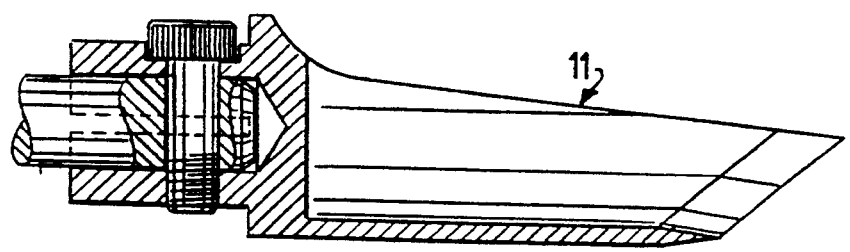
FIG. 4 is a cross sectional view of a cutting member used with the device shown in FIG. 1.
Figure 5:
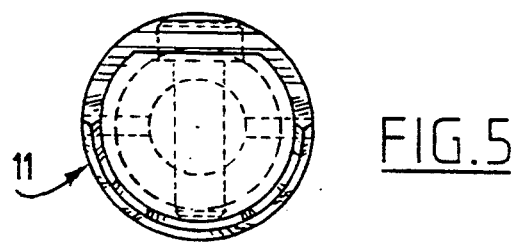
FIG. 5 shows a cross section of the cutting member depicted in FIG. 4.

The operation of the device according to the invention will now be elucidated. Firstly, a pig's head 6 is placed on the upper plate 2, this as far as possible into the cavity 5, as shown in FIG. 3. The snout 33 of the pig's head herein rests against the detection switches 7 so that the presence of the pig's head 6 is detected and so that it is possible after pressing in the safety switches 32 to set the cutting, cleaving and sawing implements into operation.

The pneumatic cylinder 19 is first energized so that the lever 16 is moved wholly upward, wherein pressure is also supplied to the hydromotor 18. As a result thereof the knife-blade 17 will begin to rotate. The rotating knife-blade 17 will herein cut into the pig's head 6. The depth of the cut depends on the force with which cylinder 19 is energized. This force is selected such that the cut extends into the rind but not, or only to a small extent, into the nose bone. The pneumatic cylinder 21 will herein likewise be energized so that the rotating knife-blade 17 will displace in horizontal direction, wherein the pressure exerted by the pneumatic cylinder 19 is such that the contour of the nose bone 39 is followed and that only the rind 38 is cut through. This operation is important for removing the mask during the following butchering procedure.

During the horizontal movement of knife-blade 17 this movement, after a certain dead zone dependent on the length of slot 30, is transmitted by means of levers 16,29,25 to the rotating saw-blade 26. This is of course driven in rotation by the hydromotor 27. The rotating saw-blade herein makes a saw cut through both the rostral bone 34 and the jaw-bone 35. The snout of the pig's head is hereby sawn into two pieces, which facilitates gripping by gripper members during the subsequent butchering operation for removal of the mask. Furthermore, by sawing the rostral bone 34 and the jaw-bone 35 each into two pieces placing of the pig's head onto the pins is likewise facilitated.

Air is then fed to the pneumatic cylinder 10 so that the cleaving knife 11 moves downward and cuts through the snout 33 of the pig, doing this between the rostral bone 34 and jaw-bone 35. The cartilage 36 present therebetween is herein cut through. As a result the rostral bone 34 comes loose so that in principle it is possible to place the thus treated pig's head 6 on pins which extend into the nasal cavity 37.

Reference is made in the above embodiment to pneumatically driven cylinders. It will be apparent that these can be replaced by hydraulically driven cylinders or by other linear drive members. It should be noted here that it is less attractive to replace the pneumatic cylinder 10 with a hydraulic cylinder because for a good cleaving action it is important that the inclined movement takes place as rapidly as possible; because of the small mass of the air it is apparent that a pneumatically driven cylinder has the advantage here.

For the driving use is made of hydromotors. This is of course an attractive solution because a hydromotor has a small volume and can thus be incorporated easily at the relevant locations. It will be apparent that other types of drive means, such as electric motors, can also be employed.

It can be attractive to increase the force on the knife driven in rotation with a weight fixed to the second lever 25.

It will likewise be apparent that diverse other modifications can be made to the device.

The above stated sequence is performed to prevent the nose from turning over. It is however possible within the scope of the invention to use another sequence.

I claim:

1. Apparatus for preparing a pig's head for mechanical boning comprising:
    a support means for upside down placing thereon of the pig's head for preparing a gap arranged in the support;
    a knife-blade which is movable through said gap;
    means for exerting an upward force on the knife-blade relative to the support, which is sufficient for the knife-blade to at least cut the rind of the pig's head; and
    means for exerting a horizontal force on the knife-blade for displacing said knife-blade along the gap; said horizontal force being sufficient for the knife-blade to at least cut the rind of the pig's head along the upper part of the head.

2. Apparatus according to claim 1, wherein the knife-blade is a substantially rotatably driven knife-blade with a substantially circular circumference.

3. Apparatus as claimed in claim 2, wherein said upward and horizontal force exerting means comprises first and second pneumatic cylinders; said rotatably drivable knife-blade being fixed to a first lever which is connected via a second lever to said first pneumatic cylinder for exerting an upward force on the rotatably drivable knife-blade, said first lever being connected to said second pneumatic cylinder for driving the rotatably drivable knife-blade in a horizontal direction.

4. Apparatus as claimed in claim 1, comprising a rotatably drivable saw-blade which is movable in a path extending in a lengthwise direction of the head from the front of the snout into the snout and which protrudes at least partially above the support plate; and wherein the rotatably drivable saw-blade is fixed to a third lever, which third lever is connected by means of a fourth lever to the first lever.

5. Apparatus as claimed in claim 4, wherein the fourth lever and the first lever are connected with play to third lever.

6. Apparatus as claimed in claim 5, wherein the rotatably drivable knife-blade is fixed to a first lever which is connected via a second lever to a pneumatic cylinder for exerting said upward force on the rotatably drivable knife-blade, said first lever being connected to a second pneumatic cylinder for driving the rotatably drivable knife-blade in said horizontal direction.

7. Apparatus as claimed in claim 1, comprising a cutting member, a rotatably drivable saw-blade which is movable in a path extending in a lengthwise direction of the head from the front of the snout into the snout and which protrudes at least partially above the support plate.

8. Apparatus as claimed in claim 7, characterized in that the apparatus is arranged for making the cut in the rind before making the cut in the snout.

9. Apparatus as claimed in claim 1, wherein the cutting member is a cleaving knife comprising a curved cutting face.

10. Method for preparing a pig's head for mechanical boning comprising placing said head upside down on a support;

making a transverse cut in the snout from the underside of the head;

and making a cut extending in a lengthwise direction through the rind in the middle of the upper part of the head, wherein the transverse cut separates the greater part of the rostral bone from the jaw-bone.

11. Method as claimed in claim 10, further comprising making a cut in the snout in a lengthwise direction which extends into the rostral bone.

12. Method as claimed in claim 11, wherein the cut extending in a lengthwise direction through the rind is made before the transverse cut in the snout.

* * * * *